US005493281A

United States Patent [19]

Owens

[11] Patent Number: 5,493,281
[45] Date of Patent: Feb. 20, 1996

[54] METHOD AND APPARATUS FOR REMOTE SYNCHRONIZATION OF AUDIO, LIGHTING, ANIMATION AND SPECIAL EFFECTS

[75] Inventor: Robert D. Owens, Orlando, Fla.

[73] Assignee: The Walt Disney Company, Burbank, Calif.

[21] Appl. No.: 282,196

[22] Filed: Jul. 29, 1994

Related U.S. Application Data

[63] Continuation of Ser. No. 950,450, Sep. 23, 1992, abandoned.

[51] Int. Cl.[6] .......................... G05B 19/02; G08C 17/02; G06F 9/445; H04Q 3/02
[52] U.S. Cl. .................. 340/825.24; 340/825.22; 340/825.69; 364/411; 364/221.2; 455/38.2; 455/140
[58] Field of Search .................. 340/825.21, 825.22, 340/825.24, 825.25, 825.69, 326, 815, 46, 384.4, 384.6, 384.7, 384.71, 384.72, 384.73; 379/63, 67; 375/356, 359, 369; 348/107, 108, 112, 734; 455/38.2, 51.1, 53.1, 66, 70, 140, 352; 472/59, 60, 61, 64, 65, 66; 369/30, 31; 362/276; 318/567, 568.11; 40/411, 427, 463; 364/410, 193, 221.2; 360/79

[56] References Cited

U.S. PATENT DOCUMENTS

| | | | |
|---|---|---|---|
| 3,767,901 | 10/1973 | Black et al. | ............... 360/79 |
| 3,898,438 | 8/1975 | Nater et al. | |
| 3,902,161 | 8/1975 | Kiowski et al. | |
| 4,330,780 | 5/1982 | Masaki | ............ 455/38.2 |
| 4,342,986 | 8/1982 | Buskirk et al. | |
| 4,483,599 | 11/1984 | MacRae et al. | |
| 4,673,993 | 6/1987 | McCaughey | ............... 360/79 |
| 4,743,981 | 5/1988 | Spencer et al. | |
| 4,840,602 | 6/1989 | Rose | ............ 340/825.69 |
| 4,855,730 | 8/1989 | Venners et al. | |
| 4,918,439 | 4/1990 | Wozniak et al. | |
| 4,918,736 | 4/1990 | Bordewijk | |
| 4,922,536 | 5/1990 | Hoque | |

OTHER PUBLICATIONS

Brochure, "Eprom Audio," Nuoptix, Inc., 1988.
Manual, "Eprom Audio," Nuoeptix, Inc., undated.

*Primary Examiner*—Alyssah Bowler
*Assistant Examiner*—Mark H. Rinehart
*Attorney, Agent, or Firm*—Pretty, Schroeder, Brueggemann & Clark

[57] ABSTRACT

Method and apparatus for synchronizing performance of audio, lighting, animation, and special effects programs at a plurality of remote locations, such as on parade floats, in which the programs are stored at each location as digitally-encoded information in the memory of one or more controllers, and DTMF tone bursts are transmitted over a selected radio frequency as a synchronization signal to each remote location for controlling synchronous performance of the programs by audio, lighting, animation, and special effects systems on the floats. The DTMF tones control retrieval from an audio controller of an audio program and a SMPTE time code signal for synchronous control of the lighting, animation, and special effects systems. The DTMF tone bursts are divided into timecode packets of discrete tones that are transmitted approximately every 700 milliseconds, wherein the first tone is a special control tone for synchronization, followed by several location tones, and the last tone is used to verify a valid timecode packet order.

34 Claims, 3 Drawing Sheets

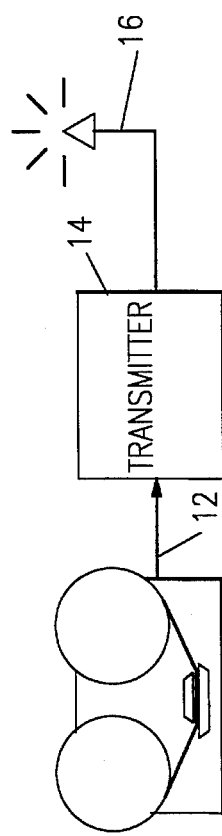
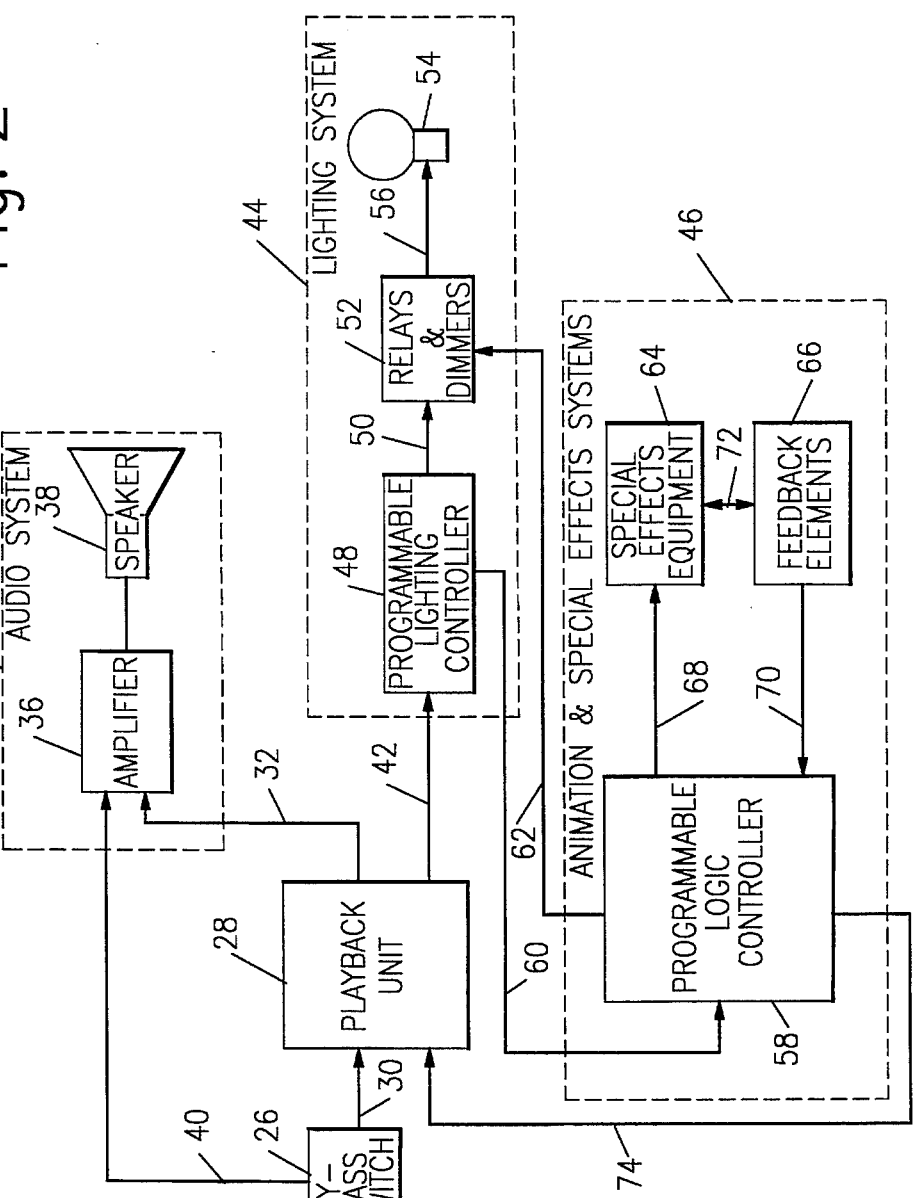
Fig. 1
Fig. 2

METHOD AND APPARATUS FOR REMOTE SYNCHRONIZATION OF AUDIO, LIGHTING, ANIMATION AND SPECIAL EFFECTS

This application is a continuation of application Ser. No. 07/950,450, filed Sep. 23, 1992, now abandoned.

BACKGROUND OF THE INVENTION

The present invention relates generally to synchronization systems and, more particularly, to a method and apparatus for synchronizing audio, lighting, animation, and special effects at remote locations such as on parade floats or the like.

In theme parks such as Disneyland Park and Walt Disney World Magic Kingdom, it has long been the practice to stage parades involving several floats that traverse a relatively long route through the park. In general, the individual floats may be equipped to play audio, including music, in conjunction with the action of animated characters and special effects and the performance of light shows on the floats. Heretofore, the practice has been to transmit audio signals to the individual floats from a central transmission location. For example, sixteen analog audio signals from a multi-track tape deck have been transmitted, each by an individual transmitter to an individual receiver operating at a different frequency on each of sixteen floats.

This existing system has several problems and disadvantages. One is that the structures in the park can interfere with the transmitted audio. This interference can cause signal drop out, which significantly degrades the quality of the audio presentation.

A related problem with utilizing individual transmitters has to do with inefficient use of radio frequency availability. Specifically, in the existing system, each of the transmitters has a high output so that it can cover a large area and overcome any signal drop out problem in the park. However, because of the high output, the transmitters collectively exhaust a wide band of the air waves so that the transmitters will not interfere with each other. Because of limited frequency availability and allocations, this restricts the transmission of audio for other purposes in the park.

Moreover, the present system is further limited in terms of synchronizing the audio, lighting, animation, and special effects on the floats. In general, to enhance the parades it would be desirable to coordinate the audio, the lighting, and the animation and special effects. For example, animated characters on any one float preferably would move in synchronism with the music and special effects sounds transmitted by that float, as well as with animated characters on other floats.

Another disadvantage is the expense associated with the existing system. The cost of acquiring and maintaining multiple transmitters and receivers, each having a backup unit of the same frequency, is substantial. In addition, there is the high cost associated with the control room support of a large mixing console, two multi-track tape decks, and other peripheral audio equipment needed to make the parades operate.

Thus, it will be appreciated that there exists a need for a system enabling synchronization of audio, lighting, animation and special effects at remote locations such as on parade floats in an efficient, reliable and cost effective manner. The present invention fulfills these needs.

SUMMARY

Briefly, and in general terms, the present invention resides in a method and apparatus for synchronizing performance of audio, lighting, animation, and special effects programs and the like, at a plurality of remote locations such as on parade floats. In accordance with the invention, the programs are stored at each remote location as digitally-encoded information, and a synchronization signal is transmitted over a selected radio frequency to each location for retrieving the information for synchronous performance of the programs through audio, lighting, animation, and special effects systems at the locations. The synchronization signal most advantageously may comprise a series of dual tone multiple frequency, or DTMF, tones for ease and reliability of radio transmission.

More specifically, in a presently preferred embodiment by way of example, a generally centrally-located RF transmitter transmits DTMF tones to an RF receiver at each remote location, where the tones are received and input to an audio controller in the form of a digital playback unit. The DTMF tones contain codes for controlling the playback units and for identifying the addresses of the selected blocks of audio information digitally stored therein which are to be played back. The tones may be divided into bursts of timecode packets of discrete DTMF tones that are transmitted approximately every 700 milliseconds, in which the first tone is a special control tone for synchronization, followed by several location tones identifying the addresses of the digitally-stored audio, and the last tone is used to verify a valid timecode packet order.

The DTMF tone bursts cause the playback units to retrieve the blocks of audio information identified by the timecode packets and provide that audio information in appropriate analog form to the audio system for reproduction. The playback unit can operate in a single play mode, in which it plays one or more audio tracks one time and then stops, or in a continuous loop replay mode, in which it replays the same tracks over and over again, depending on special DTMF control tones included in the synchronization signal.

In a further aspect of the present invention, the DTMF tone bursts also are utilized for synchronous control of the lighting, animation, and special effects systems at each remote location. In this regard, the presently preferred embodiment uses the synchronization signal to generate a timing signal in the format of standard SMPTE (Society of Motion Picture and Television Engineers) time code, which provides cues every 33 milliseconds. The SMPTE time code is stored on a track in the audio playback units and is provided to the lighting, animation, and special effects systems in response to the DTMF tone bursts to synchronize their performances with the audio program at that remote location and with the performances of programs at other remote locations.

By transmitting a synchronization signal rather than the audio programs themselves, the present invention all but avoids the drop-out problem which has plagued the prior system, while using only a single radio frequency to synchronize the audio at any number of remote locations to achieve far superior efficiency and economy. At the same time, the invention provides the ability to digitally lock the lighting, animation, and special effects systems to the audio system and to performances at other locations. Additional features and advantages of the present invention will be apparent from the following detailed description of the preferred embodiment, taken in conjunction with the accompanying drawings, which illustrate, by further way of example, the principles of the invention.

BRIEF DESCRIPTION OF THE DRAWINGS

FIG. 1 is a block diagram of a system for radio transmission of a synchronization signal for synchronization of audio, lighting, animation, and special effects at remote locations in accordance with the present invention;

FIG. 2 is a block diagram illustrating a typical system at a remote location which receives and provides the transmitted synchronization signal to an audio controller in the form of a digital playback unit to synchronize audio, lighting, animation, and special effects systems;

DESCRIPTION OF THE PREFERRED EMBODIMENT

Figure 5:
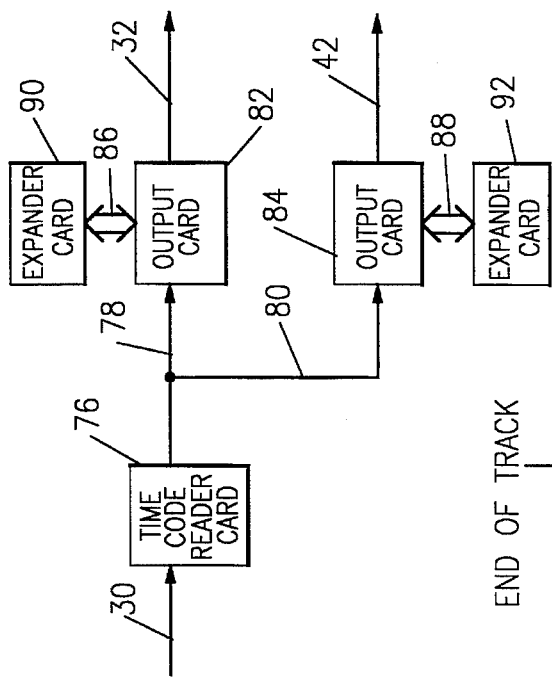
FIG. 5 is a block diagram of the digital playback unit shown in FIG. 2.

Referring now to the drawings, and particularly to FIGS. 1 and 2 thereof, there is shown by way of example a system for remote synchronization of audio, lighting, animation, and special effects in accordance with a presently preferred embodiment of the invention. Although the system illustrated is capable of synchronizing all four functions, it will be appreciated that the invention is applicable to synchronizing any combination of them or similar functions among several remote locations as desired.

The system shown in FIG. 1 utilizes a conventional magnetic tape recorder 10 which on command plays back a synchronization signal that has been pre-recorded on magnetic tape. The synchronization signal is provided as input over line 12 to an RF transmitter 14, which transmits the synchronization signal via a central antenna system 16, over a single FM frequency to each of several parade floats. Preferably, the tape recorder 10 has the capability of recording and playing back multiple tracks of audio material. This allows the tape recorder 10 to simultaneously provide music and other audio to various audio systems (not shown) by direct cable connection or by radio transmission on frequencies other than that used to transmit the synchronization signal.

A block diagram for a typical float is illustrated in FIG. 2. On the float, the synchronization signal is received by an antenna system 18 and fed over line 20 to an RF receiver 22. The synchronization signal is then normally fed by the RF receiver 22 over line 24 through a bypass switch 26 to a programmed audio controller in the form of a microprocessor-controlled digital playback unit 28 on line 30. The playback unit 28 includes one or more erasable programmable read only memories (EPROMs) in which audio material, including music, special effects sounds, and other audio is stored digitally.

The synchronization signal controls the retrieval of the audio material from the EPROMs in the playback unit 28 in a manner described in detail below. The digital audio material for the audio program to be performed at the remote location is converted into analog form and provided as input on line 32 to an audio system, indicated generally by reference numeral 34, on the float. The audio system 34 includes one or more conventional amplifiers 36 and loudspeakers 38 for reproducing the audio program stored in the EPROMs. In general, the audio material may be stored as more than one "track" in the playback unit 28, with separate amplifiers and loudspeaker arrangements for each track. For example, one track may store a main audio program for reproduction over a central or main loudspeaker system, while other tracks may store audio material for reproduction over a loudspeaker associated with a designated source on the float, such as a particular animated character or special effects device.

In the system illustrated in FIG. 2, the RF receiver 22 on the float is selectively able to receive transmissions over one of two frequencies. As noted, on one frequency the RF receiver 22 receives the synchronization signal. On the other frequency, the RF receiver 22 receives a signal carrying directly-transmitted audio material as a back-up in case of operability problems with the playback unit 28. The bypass switch 26 is a manually-operable double throw switch which, when operated, both switches the RF receiver 22 to its audio-reception frequency and couples the output of the receiver directly to the audio system 34 on line 40, bypassing the playback unit 28.

The synchronization signal also is used, in a manner described below, to generate a signal from the playback unit 28 on line 42 for controlling a lighting system, indicated generally by reference numeral 44, and animation and special effects systems, indicated generally by reference numeral 46, on the float. As shown in FIG. 2, the lighting system 44 may include a programmable lighting controller 48 connected on line 50 to various arrangements of relays and dimmers 52, which in turn are connected to various lighting elements 54 via line 56. The animation and special effects systems 46 similarly may include a programmable logic controller 58 connected by lines 60 and 62 to the lighting system 44 and to various arrangements of motors, controllers, actuators, relays, and special effects equipment such as smoke machines 64, along with encoders or other feedback elements 66 for closed loop control by the logic controller via lines 68, 70 and 72. No specific arrangements of these components of the lighting system 44 or the animation and special effects systems 46 are shown in the drawings inasmuch as their details form no part of the present invention. In general, of course, the specifics of these systems will be dictated by the theme and performance being presented and will vary considerably from float to float.

Figure 3:
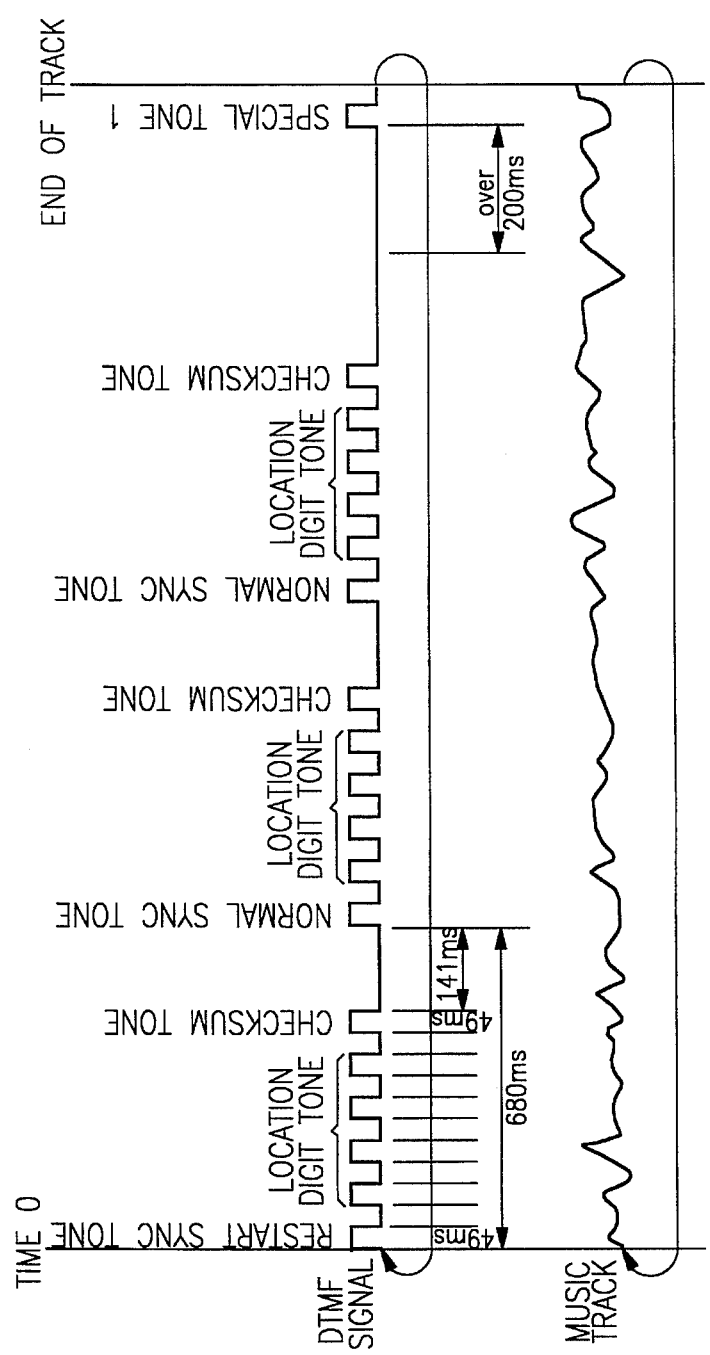
FIG. 3 is an illustration of the synchronization signal transmitted and received by the systems of FIGS. 1 and 2, respectively, for use in controlling both the playback of audio tracks stored digitally in the playback unit and the operation of lighting, animation, and special effects at the remote location.

Referring now to FIG. 3, the synchronization signal transmitted by the RF transmitter 14 comprises a string of standard telephone audio codes known as dual tone multiple frequency, or DTMF, tones. DTMF tones have the advantage that they are easy and reliable to transmit via RF signals. The DTMF codes are analog signals made up of sixteen unique codes which are used to control the playback unit 28 and to identify the locations of the blocks of music or other audio material to be played that are digitally stored in the EPROMs. Specifically, of the sixteen codes, the ten digit codes 0 through 9 are used as decimal location tones and the remaining six hexadecimal codes 'A' through 'F' are used as special control tones.

As can be seen in FIG. 3, the DTMF tones generally are divided into timecode packets comprising a burst of six discrete tones. These tones are transmitted by the RF transmitter 14 at 680 millisecond intervals, or approximately every seven-tenths (0.7) of a second. Each DTMF tone is enabled for 49 milliseconds and then disabled for 49 milliseconds before the next DTMF tone. After a series of six DTMF tones, there is a silence of 141 milliseconds to distinguish one timecode packet from the next one. A timecode packet corresponds to 96 blocks of stored audio material, each block comprising 256 digital samples or approximately 7 milliseconds. Consequently, the accuracy of the synchronization for editing any musical loop is within about seven milliseconds and, as between floats with the same audio material, there is no synchronization delay at all.

The first DTMF tone in a timecode packet is a synchronizing or "sync" control tone of one of two types, a Normal Sync Tone of value 'C' hex or a Restart Sync Tone of value 'D' hex, as explained below. The next four DTMF tones in a timecode packet are digit codes from 0000 to 9999, each uniquely identifying the location of a segment of recorded music in the EPROM of the playback unit 28. The sixth and final DTMF tone in a timecode packet is a control tone of value 'A' hex called Checksum Tone that is used to verify a valid timecode packet order by taking the sum of the four digit codes modulo 10. The remaining control tones are not part of the timecode packets. They comprise a Stop Tone of value 'F' hex, a Special Tone 1 of value 'B' hex, and a Special Tone 2 of value 'E' hex. Their functions will become apparent from the description which follows.

The operation of the playback unit 28 will now be explained with reference to FIG. 4. Upon initial start-up of the system, the synchronization signal transmitted from the RF transmitter 14 begins with a Special Tone 1 control tone, followed by a first timecode packet which has a Restart Sync Tone as its sync control tone. The Normal Sync Tone is sent at the start of every other timecode packet except the first one. After receiving Special Tone 1 and a first timecode packet which includes a Restart Sync Tone, the playback unit 28 normally starts playing from the beginning of the audio tracks recorded in the EPROMs. Every set of tone bursts that follows identifies the next segment of digitally recorded music or other audio material to be played.

Typically, consecutive tone bursts will cause the audio material to be retrieved and played back through the audio system 34 from the beginning of the tracks in the order in which it has been stored in the EPROMs. It should be appreciated, however, that playback of the audio material does not have to begin at the top of the tracks stored in the playback unit 28, if the first timecode packet identifies a different location.

Before the end of a track, all tone bursts are disabled for at least 200 milliseconds, followed by a Special Tone 1 or a Special Tone 2 pulse to signal the end of the track. Thus, as shown in FIG. 4, the playback unit 28 looks for this 200 millisecond silence after each timecode packet, including the initial timecode packet having a Restart Sync Tone. If the 200 millisecond or greater silence does not occur, but instead there is only the normal 141 millisecond silence that separates consecutive timecode packets, then the playback unit 28 will continue retrieving and playing back the next segment of audio material. However, if the 200 millisecond or greater silence does occur, the Special Tone which follows depends on whether the synchronization signal has been programmed for continuous loop replay or only for a single play of the audio program.

In the case of a parade float, the synchronization signal normally will be programmed for continuous loop replay. Typically an audio program for a parade is only about two minutes in duration, so that all viewers along the parade route will experience the same performance. In this loop mode of operation, the period of silence of at least 200 milliseconds at the end of the audio track is followed by Special Tone 1, and Special Tone 1 in turn is then followed by a timecode packet containing a Restart Sync Tone, causing the playback unit 28 to return to the beginning of the track for replay. To prevent accidental restarts, the Restart Sync Tone is always preceded by Special Tone 1. In other words, the playback unit 28 must receive Special Tone 1 just prior to receiving a Restart Sync tone before the playback unit will act upon it. To alert the playback unit, in turn, to an upcoming end of track, the 200 millisecond or greater silence before Special Tone 1 mentioned above must occur in order to prompt a restart.

If the synchronization signal has been programmed for the single play mode of operation, then the Stop Tone, as its name implies, is used to stop the playback of the recorded audio track. Similar to the Restart Tone, a special sequence of control tones is used to prevent accidental stops. Thus, before it will react to the Stop Tone, the playback unit 28 must receive Special Tone 1 just prior to receiving the Stop Tone and, in turn, it must receive Special Tone 2 just prior to receiving Special Tone 1. Again, as mentioned, a 200 millisecond or greater silence before Special Tone 2 must occur in order to effect a stop.

In a case where radio transmission to the float is lost, due for example to poor RF reception, the playback unit 28 has an internal clock that will permit it to continue playing on its own until RF reception is restored. It has been found that the playback unit 28 on the float will stay in synchronization under such conditions for approximately 12 hours. Upon re-establishing RF reception, the playback unit 28 of course will not receive a Special Tone 1 control tone followed by a timecode packet having a Restart Sync Tone, as it would upon initial start-up. Rather, in general the playback unit 28 will re-establish reception in the middle of a timecode packet having a Normal Sync Tone. To re-synchronize under such circumstances, as shown in FIG. 4, the playback unit 28 will arm itself only after receiving two consecutive valid timecode packets. Two consecutive and complete sets of tone bursts are required to reduce the possibility of confusion of poor RF signals from the RF transmitter 14 and to ensure synchronization. When that condition is satisfied, the playback unit 28 will then immediately start playing under synchronous control of the DTMF tones again upon receiving the next Normal Sync Tone.

As previously mentioned, the synchronization signal also is used to generate a signal from the playback unit 28 for synchronizing the lighting system 44 and the animation and special effects systems 46 on the float. In this connection, the lighting system 44 and the animation and special effects systems 46 are synchronized by a timing signal recorded in the EPROMs of the playback unit 28. The control signal comprises a time code standardized by the Society of Motion Picture and Television Engineers (SMPTE). This SMPTE time code is a string of time information using hours, minutes, seconds, and frames (⅓₀th of a second).

The SMPTE time code signal is stored as one audio track in the EPROMs of the playback unit 28 and is retrieved by the DTMF tone bursts in the same manner as the other audio material, except that it is then provided via line 42 to the lighting controller 48, and through the lighting controller to the logic controller 58 via line 60. The SMPTE time code permits both controllers 48 and to be programmed with a different cue every 33 milliseconds. The controllers 48 and 58 send pulses to analog and digital multi-channel ports on lines 50, 62, and 68, which in turn control dimmers, lighting circuits, animation motors, and special effects devices. As a result, all of the lighting, animation, and special effects on a float can be synchronized with the audio material stored in the playback unit 28 on the same float and with the audio, lighting, animation, and special effects on other floats, if desired.

The synchronization signal recorded on the magnetic tape recorder shown in FIG. 1 is generated by a Model TC-100 time code generator from NUOPTIX Inc. of Westlake Village, Calif. FIG. 5 illustrates a functional block diagram of the playback unit 28 shown in FIG. 1. A NUOPTIX Model DM100 TCD time code reader card 76 is coupled via lines 78 and 80 to NUOPTIX Model DM-100 HQ output cards 82 and 84, respectively, which in turn are coupled via lines 86 and 88 to NUOPTIX Model DM-100 EX EPROM expander cards 90 and 92, respectively.

Figure 4:
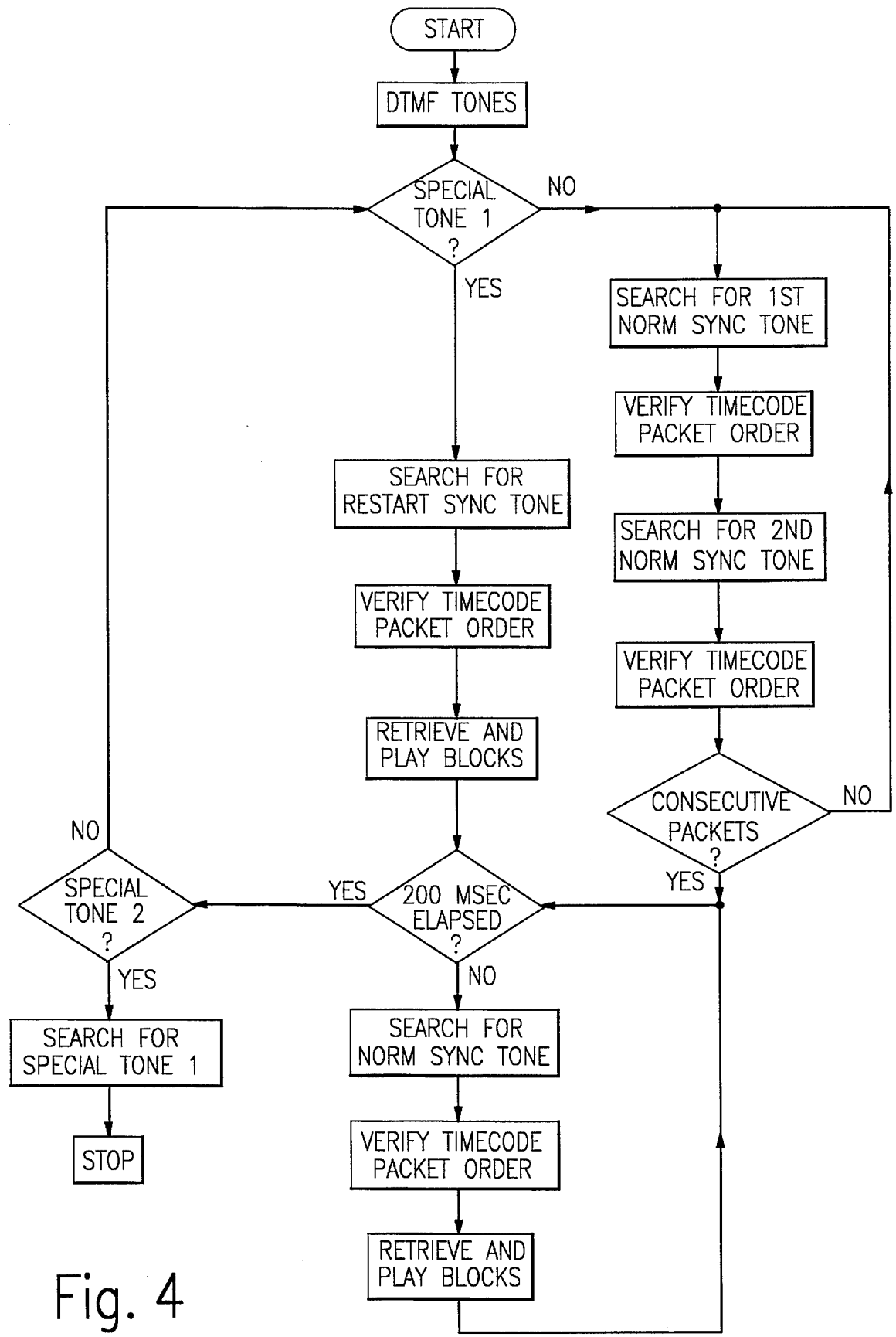
FIG. 4 is a flow chart illustrating the processing of the synchronization signal of FIG. 3 to control playback of the audio program at a remote location.

The time code reader card 76 is programmed in accordance with the flow diagram of FIG. 4 to receive the DTMF tone bursts of the synchronization signal on line 30 and control retrieval of the audio material stored on the EPROM cards 90 and 92. Each output card 82 and 84 includes an internal clock, a block counter for counting blocks of stored audio material retrieved in response to the DTMF tone bursts, an analog-to-digital converter for converting the digital audio material to an analog format, and an audio output amplifier with a trimmer for variable output control (not shown). One of the output cards 82 provides audio program material stored on its EPROM card 90 via line 32 to the audio system 34 for high fidelity, 16-bit digital audio reproduction. The other output card 84 provides the SMPTE time code signal stored on its EPROM card 92 via line 42 to the lighting controller 48, and through the lighting controller to the logic controller 58 via line 60. In the system illustrated, a lighting controller available from ELECTRONIC THEATER CONTROLS under the model name "EXPRESSION," which has been adapted to receive the synchronization signal and operate from 24 volt battery voltage on the parade float, is used for lighting controller 48.

As previously noted, the playback unit 28 can store more than one track of audio material to be retrieved and played back simultaneously. Moreover, not all of the tracks need necessarily be under continuous synchronized control of the DTMF tone bursts transmitted by the RF transmitter 14. For example, one version of the NUOPTIX playback unit has five tracks or output channels, only three of which are under the control of the DTMF tone bursts of the synchronization signal. The other two channels are single-play outputs to provide special effects audio which are initiated by a triggering signal on line 74 by the closure of an element in the animation and special effects systems 46 (FIG. 2). This playback unit can provide approximately six minutes per channel of audio storage for the three DTMF-controlled channels and two minutes per channel of audio storage for the single play outputs, using standard two megabyte EPROMs when processing at a 16-bit rate.

From the foregoing, it will be appreciated that the system that has been described overcomes the problems previously encountered in staging parades which involve a number of floats presenting performances. Not only is the problem of audio drop-out eliminated, but the digital playback units have more flexibility and better sound quality than transmitted audio. The system need only utilize one transmitter frequency, or at most two frequencies, one to send the synchronization signal and the other for back-up audio transmission, rather than the previously used sixteen frequencies, thus freeing up several radio transmission frequencies for other uses. Because the RF receivers all have the same configuration, the need to service and maintain 16 different receiver frequencies is eliminated and the number of back-up units needed is reduced. Finally, the system digitally locks the timing among the several floats, so that the audio, lighting, animation, and special effects performances can be synchronized for the entire parade.

The present invention has been described in terms of a preferred embodiment so that an understanding of the invention can be conveyed. There are, however, other configurations of systems for synchronizing audio, lighting, animation, and special effects at remote locations for which the invention is applicable. The present invention therefore should not be seen as limited to the particular embodiment described above, but encompasses all variations, modifications, and equivalents within the scope of the following claims.

I claim:

1. A method of synchronizing performance of a plurality of remote location programs at a plurality of remote locations, comprising:

(a) storing, with a controller, programs in memory at predetermined memory address locations at each of the plurality of remote locations, at least one of said programs located at corresponding memory address locations at each remote location being different from the other programs, each of said programs being stored as digitally-encoded information;

(b) transmitting a synchronization signal to each of the remote locations over a predetermined radio frequency with the use of a transmitter, said synchronization signal identifying a memory address within said predetermined memory address locations at the plurality of remote locations;

(c) receiving said synchronization signal on said predetermined radio frequency at each of the remote locations with a receiver; and (d) retrieving simultaneously with a controller at each of the plurality of remote locations said digitally-encoded program information, in response to said synchronization signal, for synchronous performance of the programs at the plurality of remote locations.

2. A method of synchronizing the performance of programs at a plurality of remote locations as defined in claim 1, wherein each of said remote locations is mobile.

3. A method of synchronizing the performance of programs at a plurality of remote locations as defined in claim 1, wherein said synchronization signal comprises a series of DTMF tone bursts.

4. A method of synchronizing the performance of programs at a plurality of remote locations as defined in claim 1, wherein said programs comprise an audio program for playback through an audio system at each remote location.

5. A method of synchronizing the performance of programs at a plurality of remote locations as defined in claim 1, wherein said programs comprise a lighting program for performance by a lighting system at each remote location.

6. A method of synchronizing the performance of programs at a plurality of remote locations as defined in claim 1, wherein said programs comprise an animation program for performance by an animation system at each remote location.

7. A method of synchronizing the performance of programs at a plurality of remote locations as defined in claim 1, wherein said programs comprise a special effects program for performance by a special effects system at each remote location.

8. A method of synchronizing performance of a plurality of remote location audio, lighting, animation, and special effects programs at a plurality of remote mobile locations, comprising:

(a) storing, with a controller, programs in memory at predetermined memory address locations at each of the plurality of remote mobile locations, at least one of said programs located at corresponding memory address locations at each remote location being different from the other programs, each of said programs being stored as digitally-encoded information;

(b) transmitting a synchronization signal to each of the remote mobile locations over a predetermined radio frequency with the use of a transmitter, said synchronization signal identifying a memory address within said predetermined memory address locations at the plurality of remote locations;

(c) receiving said synchronization signal on said predetermined radio frequency at each of the remote mobile locations with a receiver; and (d) retrieving simultaneously with a controller at each of the plurality of remote locations said digitally-encoded program information, in response to said synchronization signal, for synchronous performance of the audio, lighting, animation, and special effects programs by audio, lighting, animation, and special effects systems at each remote mobile location.

9. A method of synchronizing the performance of programs at a plurality of remote mobile locations as defined in claim 8, wherein said synchronization signal comprises a series of DTMF tone bursts.

10. A method of synchronizing the performance of programs at a plurality of remote mobile locations as defined in claim 8, wherein a time code signal is generated at each remote mobile location in response to said synchronization signal for synchronous control of said lighting, animation, and special effects systems.

11. A method of synchronizing the performance of programs at a plurality of remote locations as defined in claim 10, wherein said time code signal comprises SMPTE time code information.

12. A method of synchronizing performance of a plurality of remote location audio programs at a plurality of remote locations, utilizing digital playback units capable of storing the programs in memory for playback at each location, comprising the steps of:

a) storing, with a controller, an audio program in the memory at predetermined memory address locations at each of the plurality of playback units, at least one audio program located at corresponding memory address locations at each playback unit being different from another audio program, each of said programs being stored as a series of blocks of digitally-encoded audio information identified by unique addresses in the memory;

(b) transmitting a synchronization signal with the use of a transmitter in the form of a series of DTMF tone bursts to each of the remote locations over a predetermined radio frequency, said DTMF tone bursts containing codes for controlling the playback units and for identifying the addresses of selected blocks of audio information in the memory of the playback units to be played back;

(c) receiving said synchronization signal on said predetermined radio frequency at the plurality of remote locations with a receiver;

(d) coupling said synchronization signal to each of the playback units; and (e) causing, with a controller, each of the playback units to simultaneously retrieve said selected blocks of audio information, in response to said synchronization signal, for synchronous playback through an audio system at each of the remote locations.

13. A method of synchronizing the performance of audio programs at a plurality of remote locations as defined in claim 12, wherein the audio program comprises one or more tracks of digitally-encoded audio information, and said synchronization signal selectively causes said tracks to be played a single time or replayed continuously.

14. A method of synchronizing the performance of audio programs at a plurality of remote locations as defined in claim 12, and further including:

(f) storing in memory at the plurality of remote locations a series of digitally-encoded instructions for performance of lighting, animation, or special effects programs; and (g) retrieving said lighting, animation, or special effects programs, in response to said synchronization signal, for synchronous control of lighting, animation, or special effects systems at each remote location.

15. A method of synchronizing the performance of audio programs at a plurality of remote locations as defined in claim 14, wherein timing information stored in the playback units is retrieved, in response to said synchronization signal, for synchronous control of the lighting, animation, or special effects systems at each remote location.

16. A method of synchronizing the performance of audio programs at a plurality of remote locations as defined in claim 15, wherein said timing information comprises a SMPTE time code.

17. A method of synchronizing playback of a plurality of remote location audio programs from a plurality of remote locations, utilizing digital playback units capable of storing the audio programs in memory for playback through an audio system at each remote location, comprising:

(a) storing an audio program at predetermined memory address locations in the memory of each of the plurality of playback units, at least one audio program located at corresponding memory address locations at each playback unit being different from another audio program, each of said audio programs being stored as a series of blocks of digitally-encoded audio information identified by unique addresses in the memory;

(b) transmitting with the use of a transmitter a series of DTMF tones to each of the remote locations over a predetermined radio frequency, said DTMF tones being divided into timecode packets each of which contains special control tones for controlling the playback units and location tones for identifying the addresses of selected blocks of audio information in the memory of the playback units to be played back;

(c) receiving said DTMF tones on said predetermined radio frequency at each of the remote locations with a receiver;

(d) coupling said DTMF tones to each of the playback units; and (e) causing each of the playback units to simultaneously retrieve on command said selected blocks of audio information, in response to said DTMF tones, for synchronous playback through the audio systems at each of the remote locations.

18. A method of synchronizing the playback of audio programs from a plurality of remote locations as defined in claim 17, wherein each of said timecode packets includes a burst of several tones followed by a period of silence.

19. A method of synchronizing the playback of audio programs from a plurality of remote locations as defined in claim 17, wherein the first tone in a timecode packet is a special control tone which is utilized for synchronization of the playback of the plurality of remote locations audio programs.

20. A method of synchronizing the playback of audio programs from a plurality of remote locations as defined in claim 19, wherein one or more tones following the first tone in a timecode packet are location tones for identifying the addresses of selected blocks of audio information in the memory of the playback units to be played back.

21. A method of synchronizing the playback of audio programs from a plurality of remote locations as defined in claim 20, wherein the last tone in a timecode packet is a special control tone which is utilized to verify a valid timecode packet order.

22. A method of synchronizing the performance of audio programs at a plurality of remote locations as defined in claim 21, wherein the audio program comprises one or more tracks of digitally-encoded audio information, and said DTMF tones further include control tones for selectively causing said tracks to be played a single time or replayed continuously.

23. Apparatus for synchronizing performances of a plurality of remote location programs at a plurality of remote locations, comprising:
    a radio transmitter for transmitting a synchronization signal to the plurality of remote locations over a predetermined radio frequency;
    a radio receiver at each of the remote locations for receiving the synchronization signal;
    at least one controller at each of the remote locations, each controller having memory for storing at predetermined memory address locations the programs to be performed as digitally-encoded information identified by unique addresses in the memory, at least one of said programs located at corresponding memory address locations at each remote location being different from the other programs; and
    means coupled to each of said controllers at the remote locations for reproducing a performance in response to the information stored in said controllers,
    wherein said synchronization signal contains codes for identifying the addresses of selected blocks of information in the memories of the controllers to be played back,
    whereby said selected blocks of information at each of the plurality of remote locations are retrieved simultaneously and provided to said performance reproducing means, in response to said synchronization signal, for synchronously reproducing the performances of the plurality of remote locations.

24. Apparatus for synchronizing performances of a plurality of remote location programs at a plurality of remote locations as defined in claim 23, wherein said performance reproducing means comprises an audio playback system.

25. Apparatus for synchronizing performances of a plurality of remote location programs at a plurality of remote locations as defined in claim 24, wherein said performance reproducing means comprises a lighting system.

26. Apparatus for synchronizing performances of a plurality of remote location programs at a plurality of remote locations as defined in claim 25, wherein said performance reproducing means comprises an animation system.

27. Apparatus for synchronizing performances of a plurality of remote location programs at a plurality of remote locations as defined in claim 26, wherein said performance reproducing means comprises a special effects system.

28. Apparatus for synchronizing performances as defined in claim 24 or claim 25 or claim 26 or claim 27, wherein one or more of said remote locations is mobile.

29. Apparatus for synchronizing performance of a plurality of remote location audio, lighting, animation, or special effects programs at a plurality of remote mobile locations, comprising:
    a radio transmitter for transmitting DTMF tone bursts to the plurality of remote locations over a predetermined radio frequency;
    a radio receiver at each of the remote locations for receiving the DTMF tone bursts;
    at least one controller at each remote location coupled to each of said radio receivers at the remote locations, each controller having memory for storing the programs at predetermined memory address locations to be performed as digitally-encoded information identified by unique addresses in the memory, at least one of said programs located at corresponding memory address locations at each remote location being different from the other programs; and
    means coupled to each of said controllers at the remote locations for reproducing audio, lighting, animation, or special effects programs in response to the information stored in said controllers,
    wherein said DTMF tone bursts contain control codes and codes for identifying the addresses of selected blocks of information in the memory of the controllers,
    whereby said DTMF tone bursts cause each of the controllers at each of the plurality of remote locations to simultaneously retrieve and provide said selected blocks of information to said performance reproducing means for synchronous performance of audio, lighting, animation, or special effects at each of the remote locations.

30. Apparatus for synchronizing performance of a plurality of remote location audio, lighting, animation, or special effects programs at a plurality of remote locations as defined in claim 29, including an audio controller storing digitally-encoded information for the audio program separate from the controllers storing digitally-encoded information for the lighting, animation, or special effects programs.

31. Apparatus for synchronizing performance of a plurality of remote location audio, lighting, animation, or special effects programs at a plurality of remote locations as defined in claim 30, wherein the audio controller stores timing information for synchronization of the controllers storing digitally-encoded information for the lighting, animation, or special effects programs.

32. Apparatus for synchronizing performance of a plurality of remote location audio, lighting, animation, or special effects programs at a plurality of remote locations as defined in claim 31, wherein said timing information comprises a SMPTE time code.

33. Apparatus for synchronizing playback of a plurality of remote location audio programs at a plurality of remote locations, comprising:
    a radio transmitter for transmitting DTMF tone bursts in the form of timecode packets to the plurality of remote locations over a predetermined radio frequency, each timecode packet having a burst of several tones followed by a period of silence;
    a radio receiver at each of the remote locations for receiving the DTMF tone bursts;
    a playback unit coupled to each of said radio receivers a each of the remote locations, each playback unit having memory for storing audio programs at predetermined memory address locations to be performed as a series of blocks of digitally-encoded audio information identified by unique addresses in the memory, at least one of said programs located at corresponding memory address locations at each remote location being different from the other programs; and an audio system coupled to each of said playback units at the remote locations for reproducing the audio programs stored in said playback units, wherein the first tone in a timecode packet is a special control tone for synchronization, and one or more tones following the first tone are location tones for identifying the locations of selected blocks of audio information in the memory of the playback units to be played back, whereby said playback units simultaneously retrieve said selected blocks of audio information, in response to said DTMF tone bursts, for synchronous playback of the audio programs at each of the plurality of remote locations through the audio system at each of the remote locations.

34. Apparatus for synchronizing playback of a plurality of remote location audio programs at a plurality of remote locations as defined in claim 33, wherein the last tone in a timecode packet is a special control tone which is utilized to verify a valid timecode packet order.

* * * * *